United States Patent
Yamaguchi et al.

(10) Patent No.: US 7,113,297 B1
(45) Date of Patent: Sep. 26, 2006

(54) IMAGE INPUTTING AND OUTPUTTING APPARATUS

(75) Inventors: Takehito Yamaguchi, Osaka-fu (JP); Kazuyuki Murata, Kyoto-fu (JP); Hideyuki Kuwano, Osaka-fu (JP); Yuji Okada, Hyogo-ken (JP); Naoki Takahashi, Osaka-fu (JP); Kenji Hisatomi, Osaka-fu (JP); Joji Tanaka, Osaka-fu (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 0 days.

(21) Appl. No.: 09/495,476

(22) Filed: Feb. 1, 2000

(30) Foreign Application Priority Data

Feb. 1, 1999 (JP) .................................. 11-023982
Apr. 30, 1999 (JP) .................................. 11-123710

(51) Int. Cl.
*G06F 15/00* (2006.01)
*G06F 17/30* (2006.01)
*G06F 17/00* (2006.01)

(52) U.S. Cl. ....................... 358/1.15; 707/202; 715/512
(58) Field of Classification Search ...... 358/1.13–1.15; 715/512, 522; 707/202, 203; 415/512, 522; 416/512, 522
See application file for complete search history.

(56) References Cited

U.S. PATENT DOCUMENTS 6,286,004 B1 * 9/2001 Yoshiura et al. ............... 707/10
2001/0029513 A1 * 10/2001 Kuwano et al. ............ 707/522

FOREIGN PATENT DOCUMENTS

JP 10208868 11/1998

* cited by examiner

*Primary Examiner*—Kimberly Williams
*Assistant Examiner*—Saeid Ebrahimi
(74) *Attorney, Agent, or Firm*—McDermott Will & Emery LLP

(57) ABSTRACT

An image inputting and outputting apparatus which permits registration and fetching of document image data and which is so configured that choices with regard to registration and fetching of document image data can be made in simple procedures. To be specific, when instructions for registration and fetching document image data are received, dialog-type control means 100 inquires of the user about choices with regard to registration or fetching. On the basis of information provided by the user in answer to the inquiry, the means 100 issues instructions to document management means 300. For example, it is so arranged that the document image data just registered or fetched is specified by dialog-type control means 100 as next document image data to be fetched. That makes it possible to fetch in simple procedures again the document image data just registered or fetched.

10 Claims, 24 Drawing Sheets

F I G. 3

Dialog box for selection of function (a)

| Select function | | | |
|---|---|---|---|
| Registration | Fetching | Management | printer |
| Registration destination | Main unit | Removable | Server |
| Access right | Owner | Group | Free |
| Registration resolution | 600dpi | 300dpi | 200dpi |
| | | OK | |

Cover form display area (b)

Can register document

A4  400%  400%   ▢▷▢   A4  4≡

Normal

Light  Auto  Dark
Character  Character/Photo  Photo
Cancel  Paper size

Cover form
Zoom
Condense·Divide

Dialog box for selection of registration form

Cover form display area (c)

| Normal | Thumbnail | For fax |
|---|---|---|
| Normal | Thumbnail | For fax |

Dialog box for selection of function

456
Number of prints

| Registration | Fetching | Management | Printer |

Cover | ID input | Document attribute display

Thumbnail

Finish
Shift stack

Paper  A4

Document form | 4 | Start page (b)

Dialog box for display of attributes

Document attributes displayed
Can specify pages. To start, press OK key.

| Document ID | 0123456 | No. of pages | 20 | pages |
| Storage date | 07.12.08 | Storage form | A4 |
| Input source | Copy | Printing pages specified? |
| Storage user | 34567890 | 02 ~ 999 |
| Access right | Owner | NO | YES |

Cancel | OK

Select function.

| Registration | Fetching | Management | Printer |

Copy document    Move document
Erase document   Fetch cover

Dialog box for selection of function (b)

Copy document
Check choices and start.

Document being set
Cover    Input ID    Specify term/input source
Document attributes displayed?
No    Yes
Copy destination
Removable    Server Cancel Dialog box for setting copying options (c)

Specify term, input source, registrant, and press OK

Term

Input source    Fax send    Fax receive
              Copy    Printer    Registration
Registrant    Owner    Other registrant    Unauthorized Cancel    OK Dialog box for specifying term/input source (d)

Document attributes displayed
Can specify page. To start, press OK key.

| Document ID | 0123456 | No. of pages | 23 | pages |
| Storage date | 07.12.05 | Storage form | A4 |
| Input source | Copy |
| Storage user | 3456789 |
| Access right | Owner |

Cancel    Stop    OK    Continue

Dialog box for display of attributes at copy source

FIG. 6

| Dialog Box No. | Set Mode | Settings | Value set at factory |
|---|---|---|---|
| 1/2 | 00 Addition of DD code to document to be fetched | Setting for printing DD code on document to be fetched<br>* To be printed<br>  Not to be printed | Not to be printed |
| | 01 Storage form default (Thumbnail) (fax) 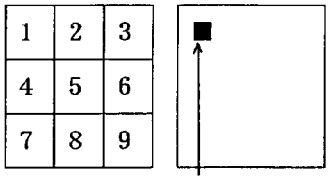 Slightly larger DD code mark | Setting for cover printing form in storage<br>* Normal, thumbnail, for fax<br>Normal: same form as original<br>Thumbnail: form with 9 pages printed on one sheet<br>For fax fetching *2: Slightly larger DD mark is printed<br>(*2 only models with fax function) | Normal |
| | 02 Document fetching form default | Setting of form in fetching document<br>* Normal (full page)<br>  Thumbnail (9 in.) | Normal |
| | 03 Cover fetching form default | Setting of printing form of cover<br>* Normal, thumbnail, for fax *2 | Normal |
| | 04 Storage resolution default | Setting of resolution in registration<br>* 600dpi, 300dpi, 200dpi<br>(300/200dpi is for character mode only) | 600 dpi |
| 2/2 | 05 Format of removable | Formatting Zip disk for DD memory<br>Formatting procedure<br>1 Insert ID card or input user ID<br>2 Insert Zip disk into disk drive unit in the main unit<br>3 Click "Start" and then "OK" *1 | |
| | 06-08 (Not used) | | |
| | 09 Exclusively for key operators | Input code to open dialog box exclusively for operators | |

FIG. 7

| Dialog Box No. | Set Mode | Settings | Value set at factory |
|---|---|---|---|
| 3/4 | 00 Access right default in storage | Setting of access right (security) in storage *Owner, group, free (no security) | Owner |
| | 01 (not used) | | |
| | 02 (not used) | | |
| | 03 (not used) | | |
| | 04 (not used) | | |
| 2/4 | 05 (not used) | | |
| | 06 Attribute display, fetching | Setting of attribute display in fetching document * To be displayed   Not to be displayed | Not to be displayed |
| | 07 (not used) | | |
| | 08 (not used) | | |
| | 09 Attribute display, document management | Setting of attribute display in document management * To be displayed   Not to be displayed | Not to be displayed |

F I G. 8

| Dialog Box No. | Set Mode | Settings | Value set at factory |
|---|---|---|---|
| 3/4 | 10 AE function | Setting of AE function<br>*Without AE function<br>Priority given to "with AE"<br>Priority given to "without AE | Priority given to "with AE" |
| | 11 Image quality default | Setting of form of original to be registered<br>*Character (main), character/photo (mix)<br>photo(main) (including photo=image) | Character |
| | 12 Contrast, photo mode | Setting of contrast (density) in photo mode<br>* Weak 2, Weak 1, Medium<br>Strong 1, Strong 2 | Medium |
| | 13 Contrast, character/photo mode | Setting of contrast (density) in character/photo(mix)mode<br>Weak, Medium, Strong | Medium |
| | 14 Sharpness, photo mode | Setting of sharpness (vividness) in photo mode<br>Weak, Medium, Strong | Medium |
| 4/4 | 15 Sharpness, Character/photo mode | Setting of sharpness (vividness) in character/photo(mix) mode<br>Weak, Medium, Strong | Medium |
| | 16 Sharpness, Character mode | Setting of sharpness (vividness) in character mode<br>Weak, Medium, Strong | Medium |
| | 17 Expanded menu default | Setting of dialog box default menu default -expanded function basic dialog box<br>*Printer, storing DD, fetching DD, DD management | DD fetching |
| | 18 (not used) | | |
| | 19 (not used) | | |

FIG. 9

| Document ID | No. of pages | Image size | Registration method | Date of Registration | Time of Registration | User ID | Access right | Media ID |
|---|---|---|---|---|---|---|---|---|
| 00000001 | 3 | A4 | COPY | 1997.01.29 | 20:10:45 | 0003 | OWNER | 0000 |
| 00000002 | 4 | B4 | FAX RECEIVE | 1997.02.01 | 06:05:05 | 0000 | FREE | 0000 |
| 00000003 | 6 | A4 | FAX SEND | 1997.02.01 | 09:17:55 | 0006 | GROUP | 0000 |
| 00000004 | 3 | A4R | PRINT | 1997.02.03 | 10:10:09 | 0003 | GROUP | 0001 |
| 00000005 | 3 | A4R | COPY | 1997.02.03 | 11:30:30 | 0003 | GROUP | 0000 |
| | | | | | | | | |

T110: Attribute management table

Dialog box for selection of fetching mode

Mode display column

F I G. 17
(a)

| Document ID | No. of pages | Image size | Date of Registration | Time of Registration | Date of fetching | Time of fetching |
|---|---|---|---|---|---|---|
| 00000001 | 3 | A 4 | 1998 01. 29 | 20:10:45 | | |
| 00000002 | 4 | A 5 | 1998 02 01 | 08:17:55 | | |
| 00000003 | 6 | A 4 | 1998 02 01 | 09:17:55 | 1998 03 10 | 10:09:20 |
| 00000004 | 3 | A 4 R | 1998 02 03 | 10:10:09 | 1998 09. 27 | 17:23:18 |
| 00000005 | 3 | A 4 R | 1998 02 03 | 11:30:30 | | |
| | | | | | | |

T 1 0 a : Attribute management table (b)

| Document ID | No. of pages | Image size | Date of Registration | Time of Registration | Date of fetching | Time of fetching |
|---|---|---|---|---|---|---|
| 00000001 | 3 | A 4 | 1998 01. 29 | 20:10:45 | | |
| 00000002 | 4 | A 5 | 1998 02 01 | 08:17:55 | | |
| 00000003 | 6 | A 4 | 1998 02 01 | 09:17:55 | | |
| 00000004 | 3 | A 4 R | 1998 02 03 | 10:10:09 | | |
| 00000005 | 3 | A 4 R | 1998 02 03 | 11:30:30 | | |
| | | | | | | |

T 1 0 b : Attribute management table

F I G. 21

| Document ID | User ID | No. of pages | Page size | Date of Registration | Time of Registration | Date of fetching | Time of fetching |
|---|---|---|---|---|---|---|---|
| 00000001 | 003 | 3 | A4 | 1998 01. 29 | 20:10:45 | | |
| 00000002 | 004 | 4 | A5 | 1998 02. 01 | 08:17:55 | | |
| 00000003 | 006 | 6 | A4 | 1998 02. 03 | 09:17:55 | 1998 03. 10 | 10:09:20 |
| 00000004 | 003 | 3 | A4R | 1998 02. 03 | 10:10:09 | 1998 09. 27 | 17:23:18 |
| 00000005 | 003 | 3 | A4R | 11:30:30 | 11:30:30 | | |

T10c : Attribute management table

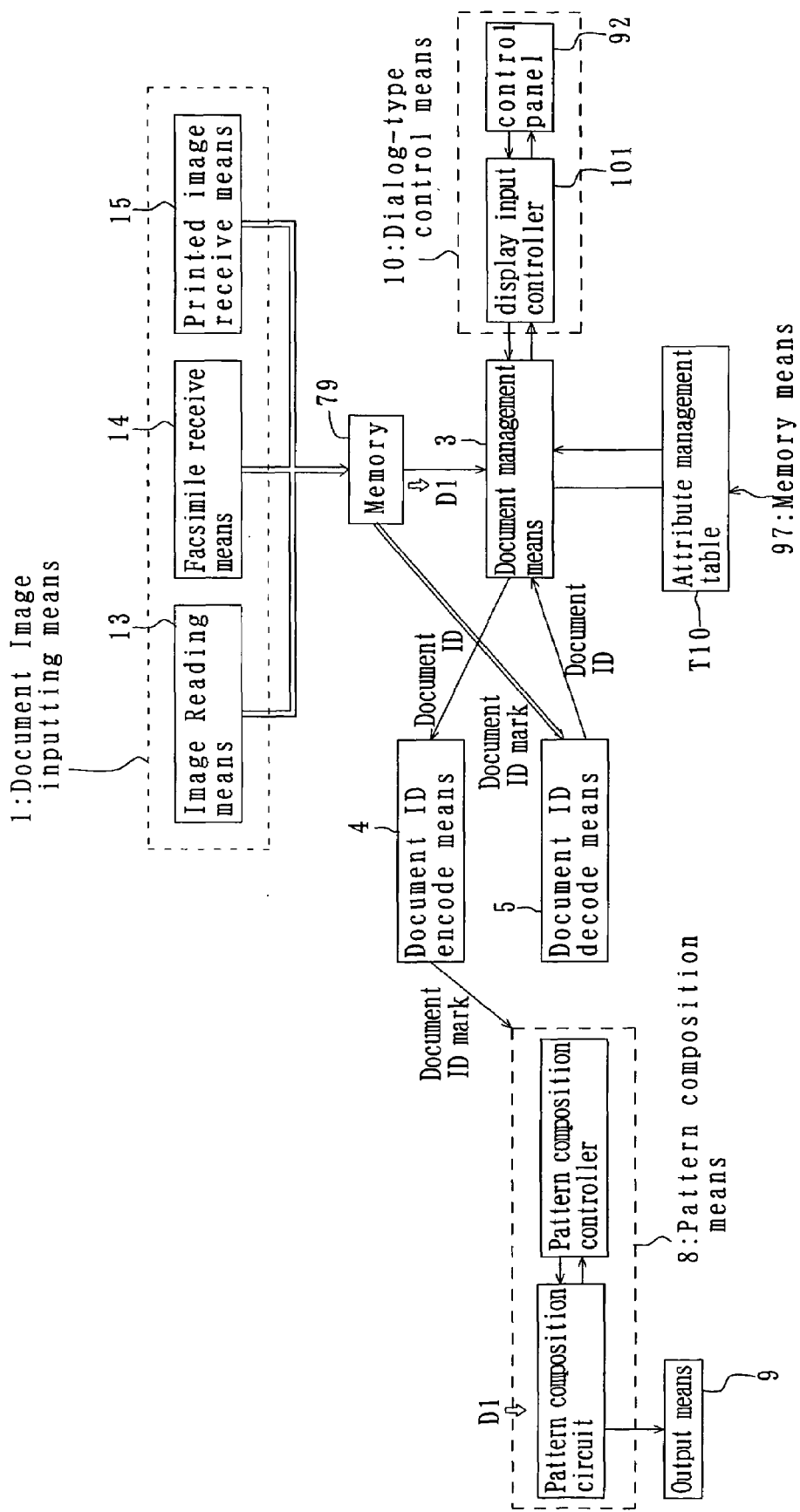

IMAGE INPUTTING AND OUTPUTTING APPARATUS

BACKGROUND OF THE INVENTION

1. Field of the Invention

The present invention relates to an image inputting and outputting apparatus and more particularly to the image inputting and outputting apparatus that permits registration and fetching of document image data.

2. Description of the Prior Art

Shown in FIG. 24 is a schematic functional block diagram of a digital multifunction apparatus or image data inputting and outputting apparatus to which the present invention relates and which was disclosed in Japanese patent laid-open publication No. 10-308868. Now, the configuration and operation of the unit will be explained.

Registration:

The digital multifunction apparatus has image reading means 13 including an automatic document feeder (ADF) and dialog-type control means 10 including a control panel 92. If an instruction for "registration" is input through the control panel 92, with a paper document set on ADF, for example, image reading means 13 converts the paper document—to be exact, information on a paper document—into document image data as the document is fed one sheet after another from ADF. The document image data is then stored in memory 79. For the document thus stored, document management means 3 then issues a document identification code (ID), an 8-digit number code, for example. Then, a file name corresponding to this document ID is given to the document image data, which is then registered with memory means 97, a hard disk, for example. At the same time, the document ID is referred to a document ID encode means 4.

Then, the document ID encode means 4 generates a document ID mark corresponding to the document ID. The document ID mark is passed on to pattern composition means 8 along with the document ID. Then, from the document ID, the pattern composition means 8 first generates a document ID image in the font in common use. And the means 8 integrates the document ID image, the document ID mark and a specific page, for example, the first page or a page with a special image, of the document image data. From that is generated a document image data with a document ID mark, that is, a cover image data with a mark. This cover image data with a mark is handed over to output means 9, for example, a printer.

Then, a cover with a mark as shown in FIG. 10 is printed out from output means 9.

Fetching:

An instruction for "fetching" is given from the control panel 92, with a cover with a mark set on ADF. The image reading means 13 converts the cover with a mark into a cover image data with a mark, which is then stored in the memory 79. With the cover image data with a mark thus stored, document management means 3 directs document ID decode means 5 to start decoding. So directed, the document ID decode means 5 decodes into a document ID the document ID mark image data contained in the cover image data with a mark and gives that document ID to the document management means 3. With that document ID as retrieval key, the document management means 3 searches memory means 97 and picks out document image data corresponding to the document ID, and hands it over to the output means 9.

Then, the output means 9 prints out a paper document corresponding to the cover with a mark.

Such an arrangement using a cover with a mark can fetch a desired document image data without going through troublesome steps like inputting the document ID.

In the aforesaid example, image reading means 13 is a document image data inputting source—document image inputting means 1. But it is not restrictive. The inputting source may be facsimile receive means 14 that receives image data from facsimile or printed image receive means 15 that receives printed image data from a computer.

But the problem with the prior art digital multifunction apparatus is that the choice is limited in the kinds of operations with regard to registration and fetching.

In the prior art digital multifunction apparatus, when a document image data just registered is to be fetched, for example, a cover with a mark is needed again just as when a different data is to be taken out. The user vividly remembers a document image data just registered and can specify that without difficulty. Yet, the cover with a mark has to be used each time. That is often troublesome.

Also, when the same document image data that has been just fetched is to be taken out, the cover with a mark has to be placed on ADF again.

It often happens that the user wants to fetch a document image data just registered or taken out and feels inconvenience each time.

SUMMARY OF THE INVENTION

In view of those problems with the prior art described above, it is an object of the present invention to provide an image inputting and outputting apparatus that permits selection and operation of functions with regard to registration and fetching of document image data through simple steps.

To be specific, the present invention is configured as follows. In an image inputting and outputting apparatus that permits registration and fetching of document image data, when an instruction for registration or fetching is received, dialog-type control means 100 asks the user about the choices with regard to registration or fetching. On the basis of the user's response to the questions, the dialog-type control means 100 gives instructions to document management means 300. That arrangement allows the user to make choices with regard to the registration and fetching through simple steps. The operation is shown in FIG. 1.

It is so arranged that the document image data just registered or fetched can be specified through the dialog-type control means 100 as next document image data to be taken out. That permits the fetching of the just registered or fetched document image data through simple steps without a cover with a mark.

The fetching just described or fetching in quick mode is effected along with user authorization to advantage. In other words, it is preferable to provide user authorization means 12 that authenticates the user according to the user's ID allocated to each user and which permits the specifying by the user ID of document image data just registered or fetched. That makes it possible for the user to fetch by simple steps the just registered or fetched document image data without a cover with a mark.

BRIEF DESCRIPTION OF THE DRAWINGS

Preferred embodiments of the present invention will be illustrated in conjunction with the accompanying drawings, in which:

FIG. 3 shows dialog box images for registration on the touch panel.

FIG. 4 shows dialog box images for fetching on the touch panel.

FIG. 5 shows dialog box images for copying a document on the touch panel.

FIG. 6 is an example of interior arrangement of default value storage means (1/3).

FIG. 7 is an example of interior arrangement of default value storage means (2/3).

FIG. 8 is an example of interior arrangement of default value storage means (3/3).

FIG. 9 is an example of interior arrangement of the attribute management table in the first embodiment.

FIG. 17 is an example of interior arrangement of the attribute management table in a second embodiment of the present invention.

FIG. 21 is an example of interior arrangement of the attribute management table in the third embodiment.

FIG. 24 is a schematic functional block diagram of the prior art digital multifunction apparatus.

DESCRIPTION OF THE PREFERRED EMBODIMENTS

Embodiment 1

Figure 1:
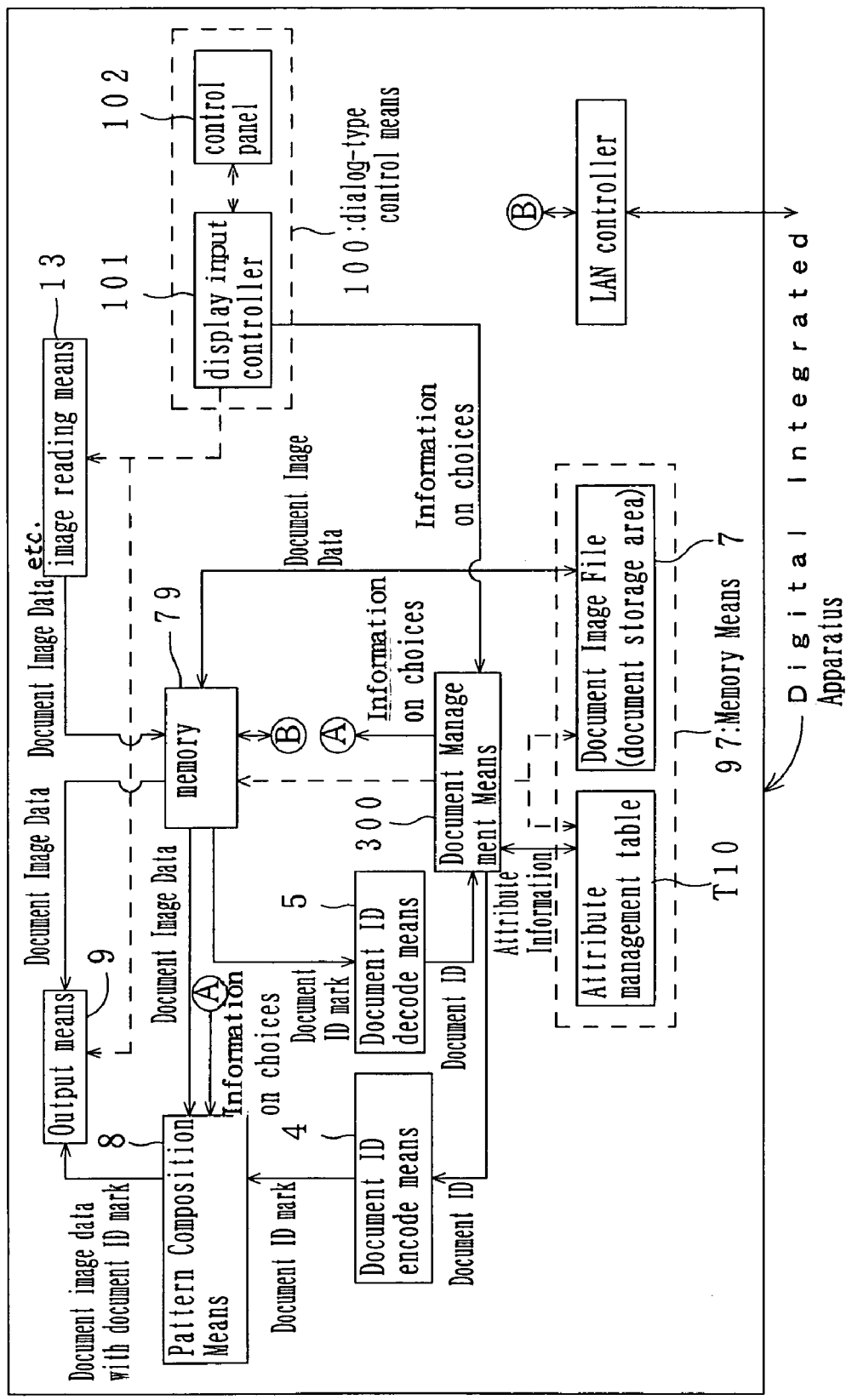
FIG. 1 is a schematic functional block diagram of the digital multifunction apparatus of a first embodiment of the present invention.

FIG. 1 is a schematic functional block diagram of the digital multifunction apparatus in which the present invention is applied. The present embodiment will be explained with the description limited to the points different from those of the prior art digital multifunction apparatus.

Figure 2:
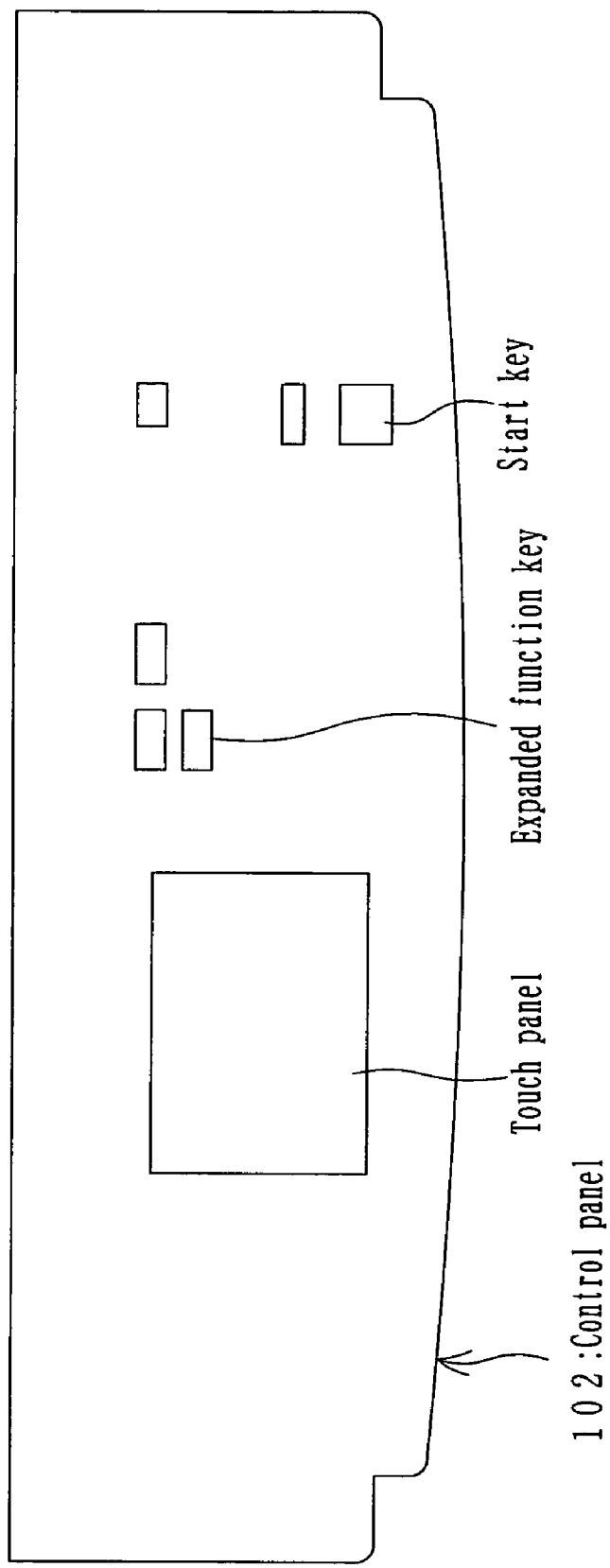
FIG. 2 is a schematic exterior view of the control panel.
Figure 13:
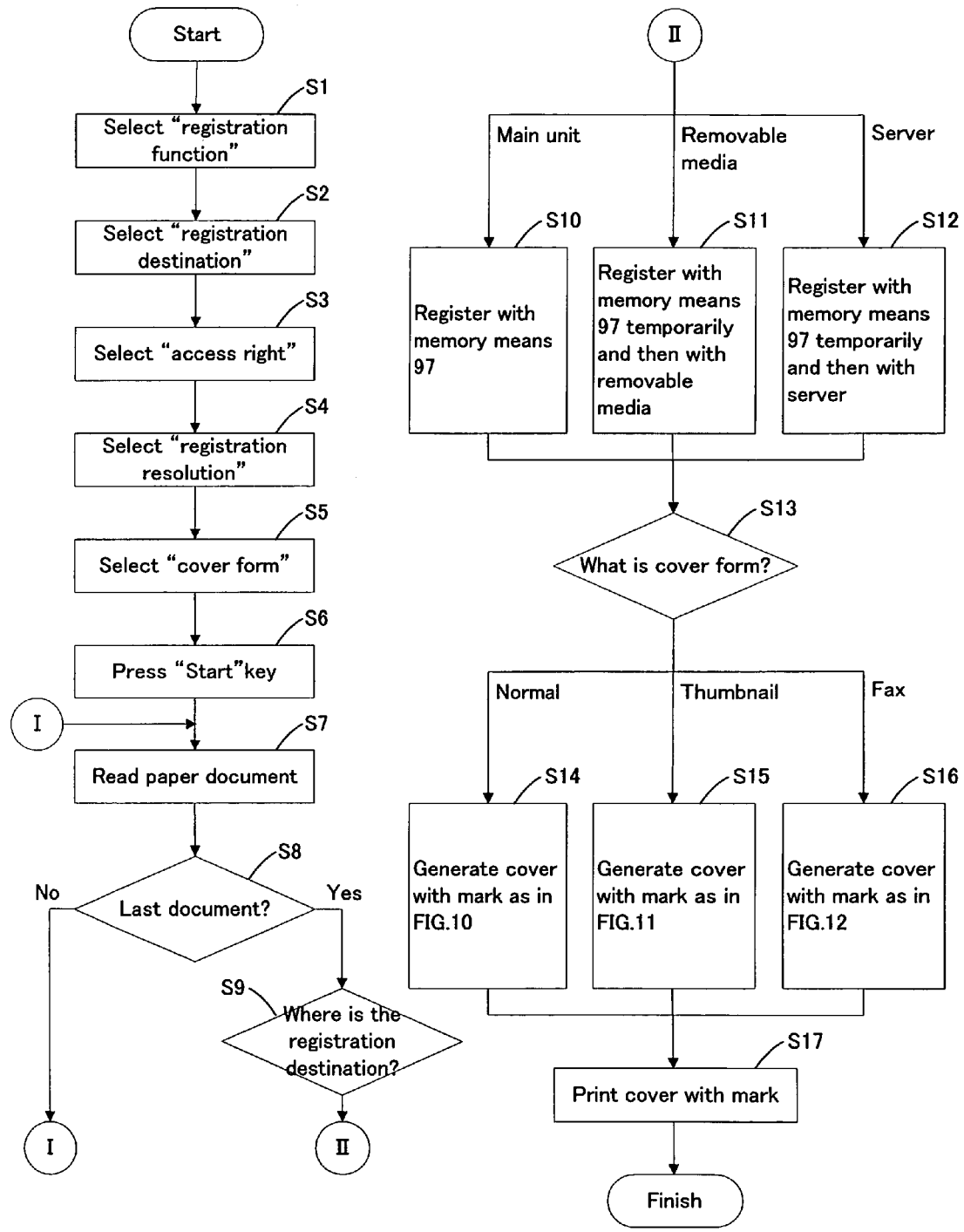
FIG. 13 is a flow chart of the process of registration in the first embodiment.

Registration:

First, the paper document is set on ADF, and the expanded function key is pressed on a control panel 102 as shown in FIG. 2. A display input controller 101 displays a dialog box for user authorization on a touch panel included in the control panel 102. When the user authorization is over, a dialog box for selection of function, with registration function chosen, as shown in FIG. 3(a) is displayed (FIG. 13, Step S1).

It is noted that the paper document is placed on ADF in such a way that the first page will be fed last. The user authorization is not the purpose of the present invention and will not be explained.

In the next step, selection is made with regard to "Registration destination," "Access right" and "Registration resolution" on the dialog box for selection of function and the selection information is retained by the display input controller 101. The OK button is pressed, and the display input controller 101 displays a dialog box for selection of registration form as shown in FIG. 3(b) on the touch panel (FIG. 13, Step S2–S3–S4).

It is understood that as used herein the term "Registration destination" is a storage destination where document image data are to be registered. The choice can be made of "Main unit," "Removable media" or "Server." The "Access right" means the access right to document image data to be registered and offers the choice of "Owner," "Group" or "Free," which will be described later. The "Registration resolution" denotes the resolution of document image data to be registered. The choice offered is "600 dip," "300 dip" or "200 dpi."

Then if the key "Cover form" is pressed on the dialog box for selection of registration form, the display input controller 101 displays the following output form images of cover with a mark on the cover form display area in the following order (FIG. 13, Step S5): "Normal (portrait)," "Thumbnail (landscape)," "For fax (portrait)," "Normal (landscape)," "Thumbnail (landscape)," "For fax (landscape)," "Normal (portrait)" and so on. What "Normal," "Thumbnail" and "For fax" are like will be described later.

If the start key is pressed on the control panel 102 (FIG. 2) after the OK button is pressed on the dialog box for selection of registration form, the display input controller 101 instructs the image reading means 13 to start reading out the paper document set on ADF and passes the choices made or selection information retained to the document management means 300 (FIG. 13, Step S6).

So instructed, the image reading means 13 converts information on the paper document into document image data as ADF feeds the data one sheet after another. The image reading means 13 then stores the document image data in the memory 79 and then informs the display input controller 101 to the effect that the reading is over. So informed, the display input controller 101 displays such messages as "Is this the last document sheet?" on the touch panel to ask the user if there is any paper document sheet yet to be set on ADF (FIG. 13, Steps S7–S8). It can happen that a paper document contains too many sheets to set on ADF at a time and has to be divided into a number of portions. Since those portions to be set on ADF have to be handled as one paper document, that inquiry is made, which will be described later.

If, with a remaining portion of the sheets of the paper document set on ADF, the button "No" is pressed in answer to that message indicating that there are still some sheets that have failed to be set on ADF, the display input controller 101 instructs the image reading means 13 to start reading the paper document on ADF. Receiving the instructions, the image reading means 13 reads and stores the document image data in the memory 79 in the same manner as described above. Then, the image reading means 13 informs the display input controller 101 to the effect that the reading is completed. The display input controller 101 then displays the above message again on the touch panel (FIG. 13, Steps S8–S7–S8).

If, on the other hand, the button "Yes" is pressed in answer to that message indicating that there are no sheets of the paper document left, then the display input controller 101 instructs the document management means 300 to begin registration.

The subsequent procedure is the same as that of the prior art except that registration is made on the basis of selection information given to the document management means 300.

To illustrate, the document management means 300 registers the document image data with the hard disk 97 if the main unit is chosen as "registration destination." The data will be registered with the removable media, for example, a magneto-optical disk, set in a removable media drive (not shown) if the "registration destination" chosen is "removable media" (FIG. 13, Steps S9–S11). The data will be registered with the server (not shown) connected to the digital multifunction apparatus via LAN controller LC if the chosen registration destination is "server."

In case document image data is to be registered with removable media or a server, the document image data is preferably stored in the hard disk 97 temporarily before registration. That ensures registration of document image data with the hard disk 97 when little space is left in the removable media or an attempt to connect with the server fails.

Figure 10:
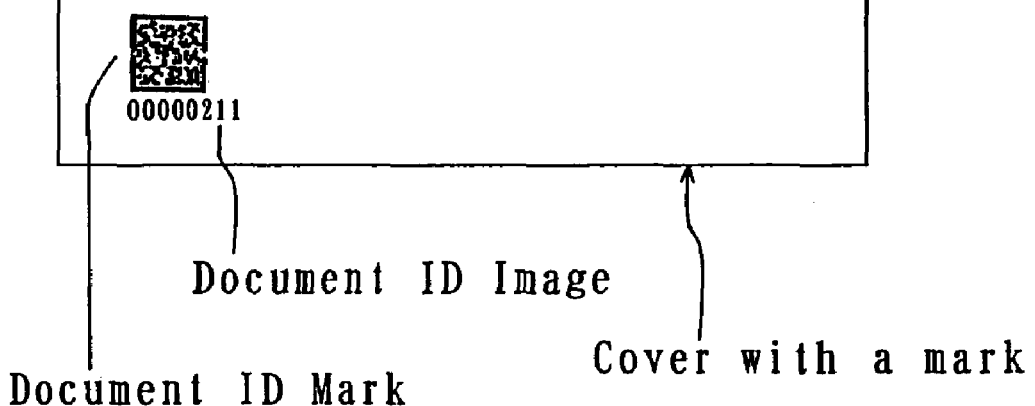
FIG. 10 is an illustration of a cover with a mark (normal).
Figure 11:
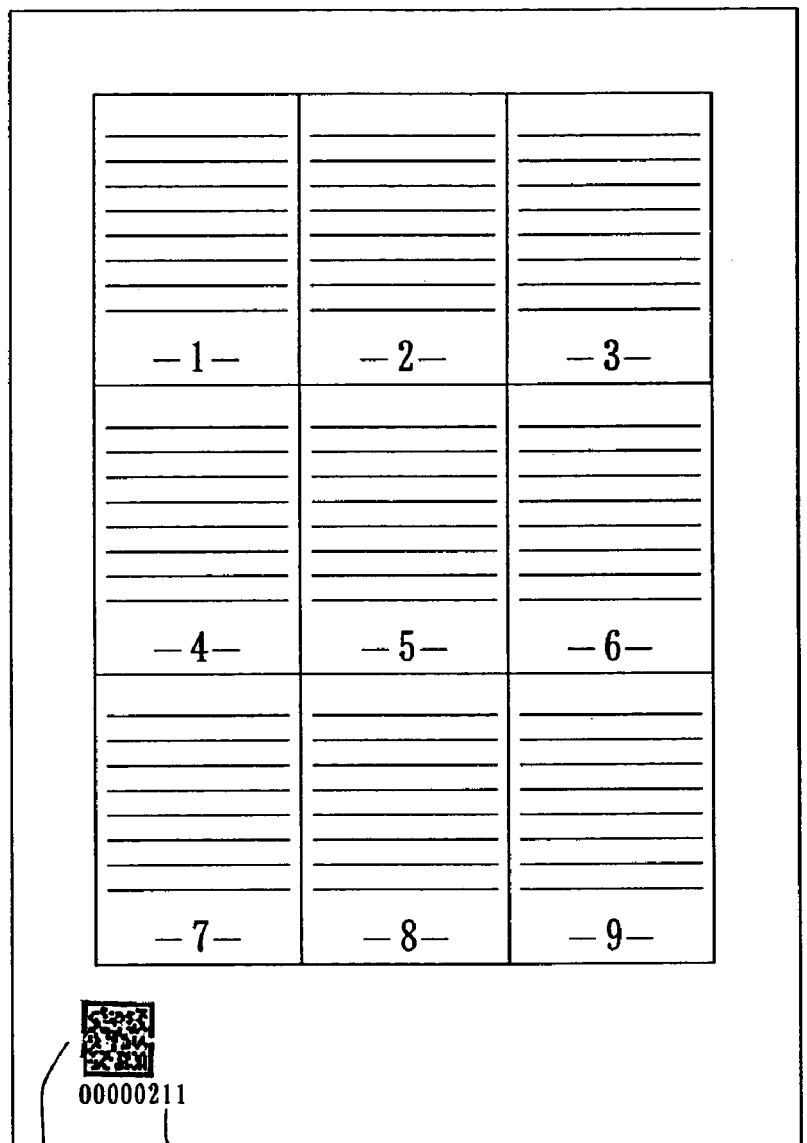
FIG. 11 is an illustration of a cover with a mark (thumbnail).
Figure 12:
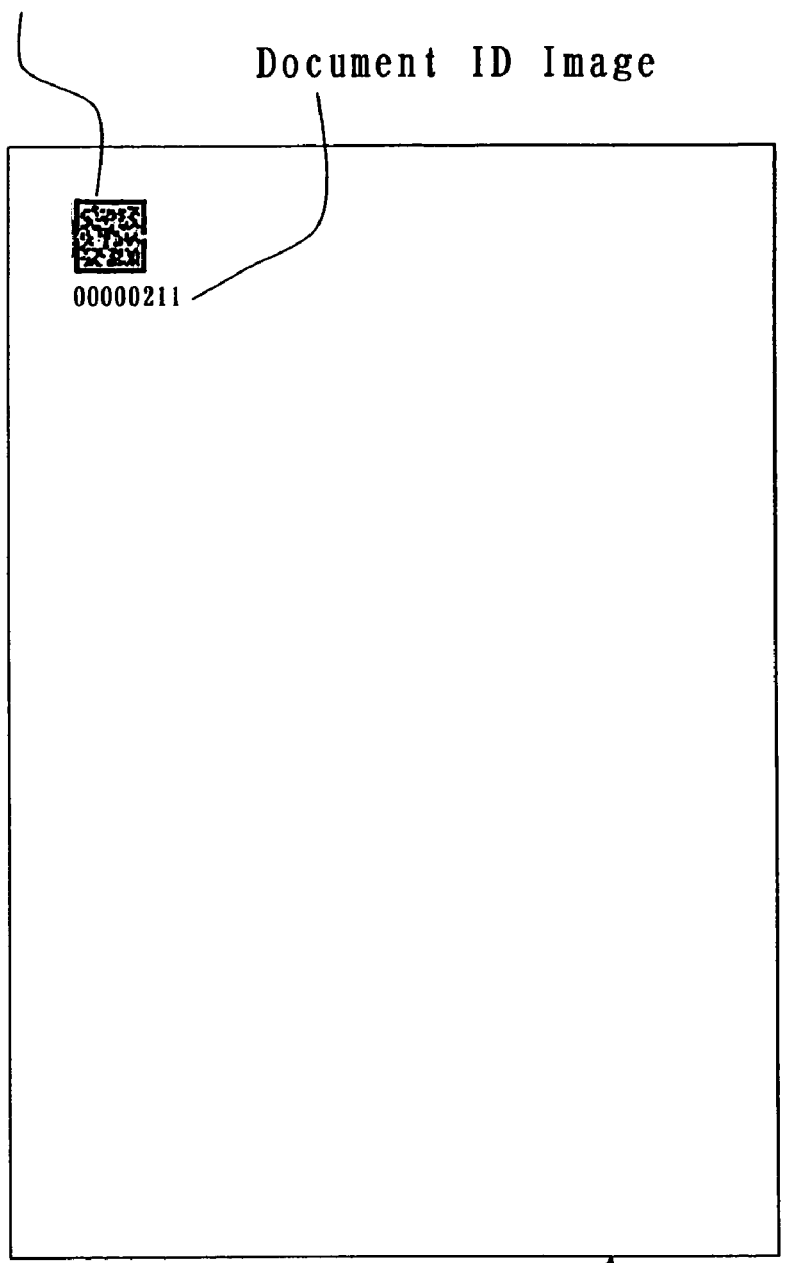
FIG. 12 is an illustration of a cover with a mark (for fax).

The document management means 300 also notifies the pattern composition means 8 which cover form is chosen, "Normal," "Thumbnail" or "For fax." So notified, the pattern composition means 8 generates a cover with a mark as in the prior art (FIG. 10) (FIG. 13, Steps S13–S14) in case "Normal" is selected. The means 8 generates a cover with a mark containing a specific number of pages, say, 9 pages of the document image data to be registered including the first page (FIG. 11) if "Thumbnail" is chosen (FIG. 13, Steps S13–S15). The number of pages is such that what the document image data is like can be known from those pages. If "For fax" is chosen, a cover with an enlarged mark (FIG. 12) is generated (FIG. 13, Steps S13–S16). An enlarged mark reduces the possibility that attempts to decode the document ID fail even if the document ID mark is blurred after fax transmission.

The subsequent procedures of printing the generated cover with a mark are the same as in the prior art ((FIG. 13, Step S17).

The reason why there is provided a step of inquiring the use if there are sheets of the paper document left that are yet to be set on ADF is this. When a cover with a mark is generated, the first page of the document image data can be specified. In case "Thumbnail" is chosen, the cover contains 9 pages including the first page. That is, even if all the sheets of the paper document can not be set on ADF, the pattern composition means 8 can specify as the first page the last page stored in the memory 79, because the last page fed is the first page of the paper document. It is understood that the last page fed means the last page of the last portion of sheets of the document image data. Needless to say, it is so arranged that in case the paper document is set in such a way that the first page is first fed, the page that will be taken as first page by the pattern composition means 8 will be the page stored first in the memory 79.

When the mode is set to not to the usual registration but the copy-registration mode in which copying and registration are both effected, on the other hand, the document image data read by the image reading means 13 is immediately printed out by the output means 9. In the copy-registration mode, all the pages of the document image data corresponding to the cover image data with a mark are printed out along with the cover image data with a mark by the output means 9.

It is so arranged, therefore, that if the mode is set to copy-registration, the message "Is this the last document sheet?" is displayed to ask the user if there is any paper document sheet yet to be set on ADF before the first page of the document image data is inputted by the image reading means 13. In case the paper document is set on ADF in portions, the message is displayed each time every portion of sheets is placed on ADF. This inquiring step is not limited to the copy-registration mode, but may be adopted in the usual registration mode.

It is noted that the prior art has already been provided with the copy registration function and switchover function to switch over between the copy-registration mode and usual registration mode. Those functions will not be described.

Figure 14:
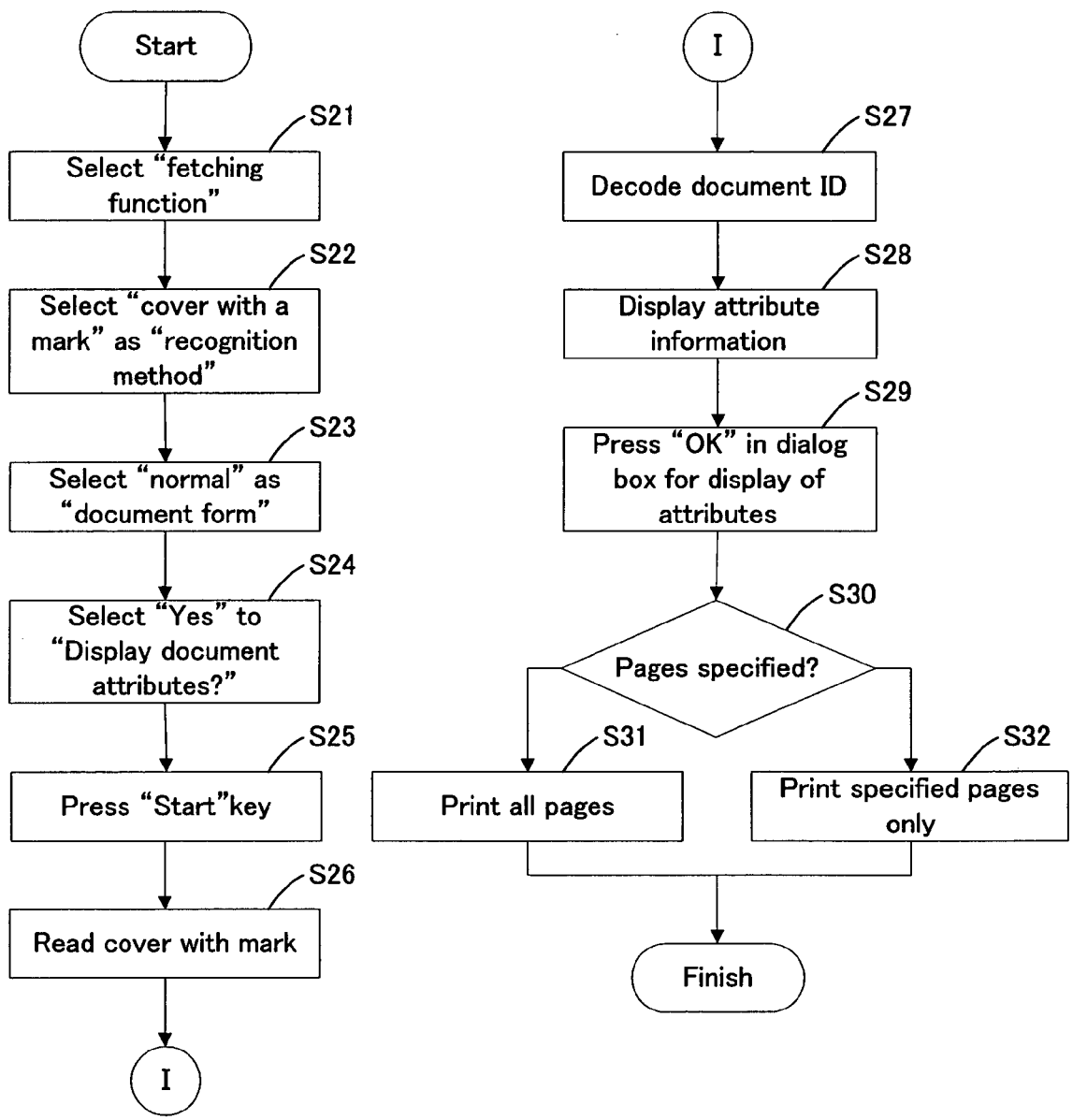
FIG. 14 is a flow chart of the process of fetching in the first embodiment.

Fetching:

First, the expanded function key is pressed on the control panel 102, and the display input controller 101 displays on the touch panel a dialog box for selection of function as shown in FIG. 4 (a) in the same manner as for registration as described (FIG. 14, Step S21). FIG. 4 (a) shows a dialog box that appears after the fetching function is selected.

On the dialog box for selection of function, selection is made with regard to "recognition method," "document form" and "Display document attributes?" The term "recognition method" means a method of recognizing or specifying a document image data to be fetched, and a choice is given between "a cover with a mark" or "Input ID." The term "document form" denotes the form of a document image data to be fetched and the choice is either "Normal" or "Thumbnail." And the message "Display document attributes?" is about whether to display attribute information concerning the document image data to be fetched, and either "Yes" or "No" is to be chosen. It is understood that the term "Input ID" means inputting the document ID from the control panel 102. On the basis of that, the document image data to be fetched is recognized or found out.

Now, there will be described the operation in case "a cover with a mark" is chosen for "recognition method," "Normal" for "document form" and "Yes" to "Display document attributes?" (FIG. 14, Steps S22–S23–S24).

First, the start key on the control panel 102 is pressed with a cover with a mark set on ADF (FIG. 14, Step S25). The display input controller 101 instructs the image reading means 13 to start reading the cover with a mark set on ADF, and refers the choices made or selection information it retains to the document management means 300.

On receiving the instructions, the image reading means 13 converts a cover with a mark set on ADF into a cover image data with a mark and stores the data in the memory 79 (FIG. 14, Step S26). As the cover image data with a mark is stored, the document management means 300 receives a document ID from the document ID decode means 5 in the same manner as in the prior art. The means 300 then acquires attribute information corresponding to that document ID from an attribute management table T10 as shown in FIG. 9, which will be described in detail later, and refers the information to the display input controller 101 (FIG. 14, Step S27).

Here, the display input controller 101 displays information contained in the aforesaid attribute information—information including "document ID," "storage date" and "input date"—on a specific area of the dialog box for display of attributes as shown in FIG. 4 (b) (FIG. 14, Step S28). That enables the user to know the outline of the document image data before deciding whether to fetch the document image data.

It is also possible to specify a range of pages to fetch out of the document image data by selecting "Yes" to "Specify pages to be printed?" on the dialog box for display of attributes. The information specified here is retained by the display input controller 101 as selection information.

Then, if the OK button is pressed on the dialog box for display of attributes (FIG. 14, Step S29), the display input controller 101 hands the selection information it retains to the document management means 300. And in case "No" is selected to "Specify pages to be printed?" the document management means 300 takes out all the pages of the document image data corresponding to the document ID from the hard disk 97 and hands them to the output means 9 (FIG. 14, Steps S30–S31). If "Yes" is selected to "Specify pages to be printed?" only the specified pages corresponding to the document ID are taken out from the hard disk 97 and passed to the output means 9 (FIG. 14, Steps S30–S32).

As set forth above, the digital multifunction apparatus according to the present invention permits selection with regard to registration and fetching through simple steps.

The process has been described of fetching a document image data using a sheet of cover with a mark. It is also possible to take out a plurality of document image data using a plurality of covers with a mark. In that process, it is so arranged that if an error occurs in reading a cover with a mark—for example, the second cover with a mark in fetching four document image data with four covers with a mark—, the display input controller 101 inquires of the user whether to resume the inputting.

The process has been described on the premise that the document image data, an object to be fetched, has been registered with the hard disk 97. But this is not restrictive. Document image data that are registered with removable media or a server can be fetched the same way. It is so arranged that in case three kinds of memory means 97 are adopted, the document management means 300 searches the removable media, hard disk 97 and the server for the document image data in that order.

Management:

The digital multifunction apparatus to which the present invention is applied permits selection by simple procedures of various operations with regard to not only registration and fetching but also management of registered document image data including copying, moving, erasing and fetching of covers.

Now, the copying of documents will be described.

Figure 15:
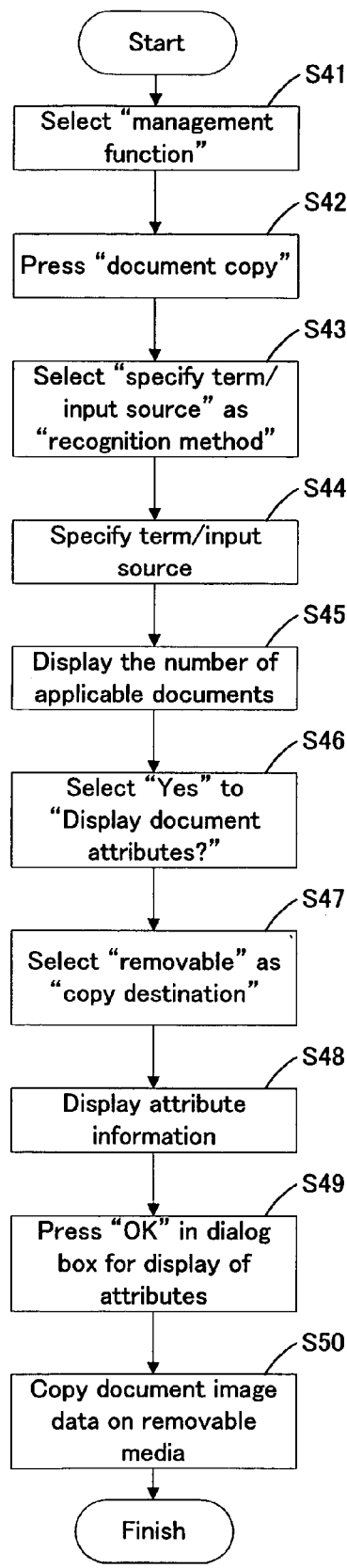
FIG. 15 is flow chart of the process of management operations (copying a document).

When the expanded function key is pressed on the control panel 102, the display input controller 101 displays the dialog box for selection of function—management function—as shown in FIG. 5 (a) in the same manner as that described for registration. If the "Document copy" is pressed, a dialog box for setting copying options as shown in FIG. 5 (b) appears (FIG. 15, Steps S 41–S42).

The dialog box for selection of function gives choices with regard to "Recognition method," "Display document attributes?" and "Copy destination." The term "Recognition method" is a method of recognizing or specifying a document image data at the copy source, and a choice is given between "Cover with a mark," "Input ID" or "Specify term/input source." The message "Display document attributes?" is about whether to display attribute information concerning the document image data to be fetched, and either "Yes" or "No" is to be chosen. The term "Copy destination" indicates where the document image data at the copy destination is registered, and the choice is "Removable" or "Server."

Now, there will be described the process in case "Specify term input source" is selected for "Recognition method," "Yes" to "Display document attributes?" and "Removable" for "Copy destination."

First, the button "Specify term/input source" is pressed on the dialog box for setting copying options. The display input controller 101 displays a dialog box for specifying term/input source as shown in FIG. 5 (c). A choice is made with regard to "Term," "Input source" and "Registrant." Then the OK button is pressed, and the document management means 300 is instructed to return attribute information on the choices (FIG. 15, Steps S43–S44).

In "Term," the user specifies a range or term during which the document image data at the copy source is thought to have been registered. In "Input source," the user selects one of the options—"Fax send," "Fax receive," "Copy," "Printer" and "Registration (image reading means 13)." In "Registrant," the user selects among "Owner," "Another registrant" and "Unauthorized person." It is noted that "Printer" is selected when the aforesaid document image data at copy source is print image data from a personal computer (not shown) connected with this inventive digital multifunction apparatus via LAN controller.

In the next step, the document management means 300 acquires from the attribute management table T10 attribute information against the choices made above—attribute information that satisfies the choices made in "Term," "Input source" and "Registrant." The means 300 then returns the attribute information to the display input controller 101. In turn, the controller 101 displays the number of cases of the aforesaid attribute information as "number of applicable documents" on a dialog box for setting copying options (this state not shown) (FIG. 15, Step S45).

Then, let it be supposed that the start key is pressed on the control panel 102 with "Yes" selected to "Display document attributes?" and "Removable" chosen as "Copy destination." The display input controller 101 then displays the attribute information with respective information items on a document (in case of a plurality of documents, any of them) given in applicable areas on a dialog box for display of attributes as shown in FIG. 5 (d) (FIG. 15, Steps S46–S47–S48). That enables the user to know an outline of the document image data at copy source before deciding whether to copy the document.

Here, if the cancel button is pressed down on the dialog box for display of attributes and if another attribute information is present, the display input controller 101 displays that attribute information at the specific area on the dialog box for display of attributes at copy source. If no other information is present, an initial dialog box (not shown) will be displayed.

If, on the other hand, the OK button is pressed on the dialog box for display of attributes at copy source, the display input controller 101 instructs the document management means 300 to copy the document image data corresponding to the attribute information now on display. So instructed, the document management means 300 copies the document image data from the hard disk 97 to the removable media (FIG. 15, Steps S49–S50).

As set forth above, the digital multifunction apparatus to which the present invention is applied permits selection of various choices with regard to copying in simple procedures.

There has been described the process of copying document image data from the hard disk 97 on to removable media by way of example. It goes without saying that document image data can be copied among the hard disk 97, removable media and server.

It has been so configured that registered document image data are managed by the digital multifunction apparatus. The invention is not restricted thereto. The management may be effected by the server.

It is also noted that no mention has been made in particular of a method of default values of various choices with regard to registration, fetching and management. There may be provided default value storage means (see FIGS. 6 to 8) for storing default values inputted by the user via the dialog-type control means 100 so that respective means effect registration, fetching and management on the basis of the contents of the default value storage means.

"Document moving" or the process of moving document image data is the same as "Document copying" described above except that "Moving destination" is to be selected instead of "Copying destination (see the dialog box for setting copying options)" and no choice is made with regard to "Registrant" (see the dialog box for specifying term/input source). "Document erasing" or the process of erasing document image data is identical with "Document copying" described above except that no choice is made with regard to the registrant. "Cover fetching" or the process of fetching only a cover with a mark is carried out the same way as "Document copying" except that "Output form of cover with a mark" is selected instead of "Copying destination." Therefore, those processes will not be described in detail.

It is noted that while a choice is made with regard to "Registrant" in the processes of copying a document and fetching a cover, that choice is excluded in the processes of moving a document and erasing a document. That is because the user who can move or erase documents is limited to the registrant of the document image data being handled. That is, the person who can move a document is the user who has registered the document image data to be moved, while the person who can erase a document is the user who has registered the document image data to be erased.

It is also so configured that in "Cover fetching," a choice is given among "Normal," "Thumbnail" and "For fax" as output form of a cover with a mark the same way as in the aforesaid process of registration.

Embodiment 2

As mentioned earlier in this specification, the prior art digital multifunction apparatus has an disadvantage that a cover with a mark is needed each time to fetch the same document image data that has just been registered as in fetching another document image data. Similarly, a cover with a mark is needed to taken out the same document image data that has just been fetched.

In view of that problem, the present embodiment is so configured that document image data just registered or fetched can be taken out in simple steps without a cover with a mark. The configuration will now be described.

First, the document management means 300 in the present embodiment has the following functions including the features of the first embodiment.

(1) Issues a document ID for each document image data to be registered.

(2) Manages registered document image data using the attribute management table T10 that is prepared with records representing document image data.

(3) Refers to the attribute management table T10 when a document ID is inputted, and finds out the document image data corresponding to the document ID.

(4) Writes the date and time of registration on the attribute management table T10 when registration is made.

(5) Writes the date and time of fetching on the attribute management table T10 when a document image data is fetched.

Furthermore, the attribute management table T10 in the present embodiment has the following fields including the same fields as in the first embodiment. Hereinafter, the attribute management table T10 shall be referred to as "attribute management table T10*a*."

To be specific, the attribute management table T10*a* has a field for document ID where the document ID of document image data is entered, a field for the number of pages where the number of pages of document image data is written, and a field for image size. There are also fields for the date of registration and the time of registration where the date and time of registration are written. The attribute management table T10 also includes a field for the date of fetching where the date of fetching document image data is written and a field for the time of fetching where the time of fetching document image data is entered.

The fields for the date and time of fetching are updated each time document image data is taken out. That is, the date and time entered in those fields are always latest.

The manner of operation of that arrangement will now be described.

Registration:

First, registration will be explained with reference to FIG. 18.

Figure 18:
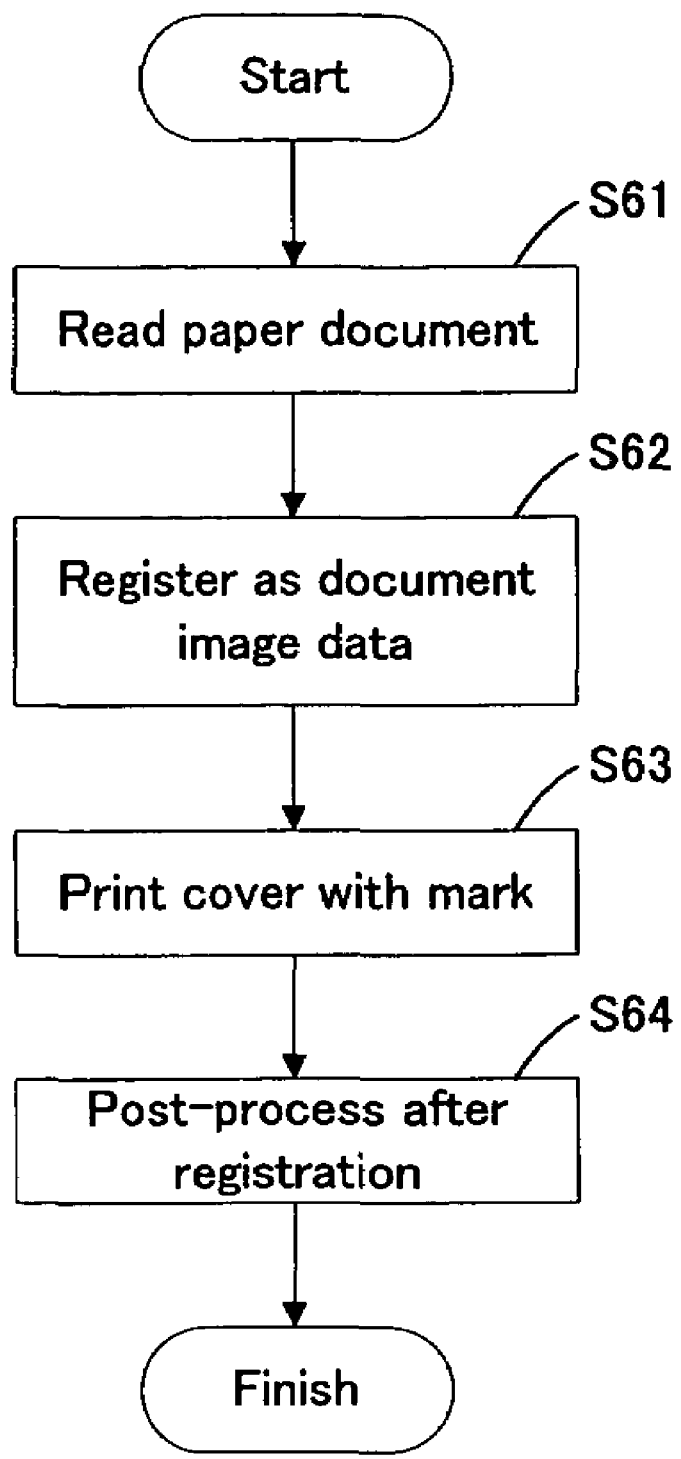
FIG. 18 is a flow chart of the process of registration in the second embodiment.

The paper document is registered as document image data in the same manner as in the first embodiment (FIG. 18, Steps S61–S63). And when a cover with a mark is printed out, the document management means 300 does the following post-processing after registration (FIG. 18, Step S64).

That is, the document management means 300 enters attribute information on the registered document image data in the fields of the table T10*a* for document ID, number of pages, image size, the date of registration and the time of registration.

Fetching:

Fetching will now be described with reference to FIG. 19.

Figure 16:
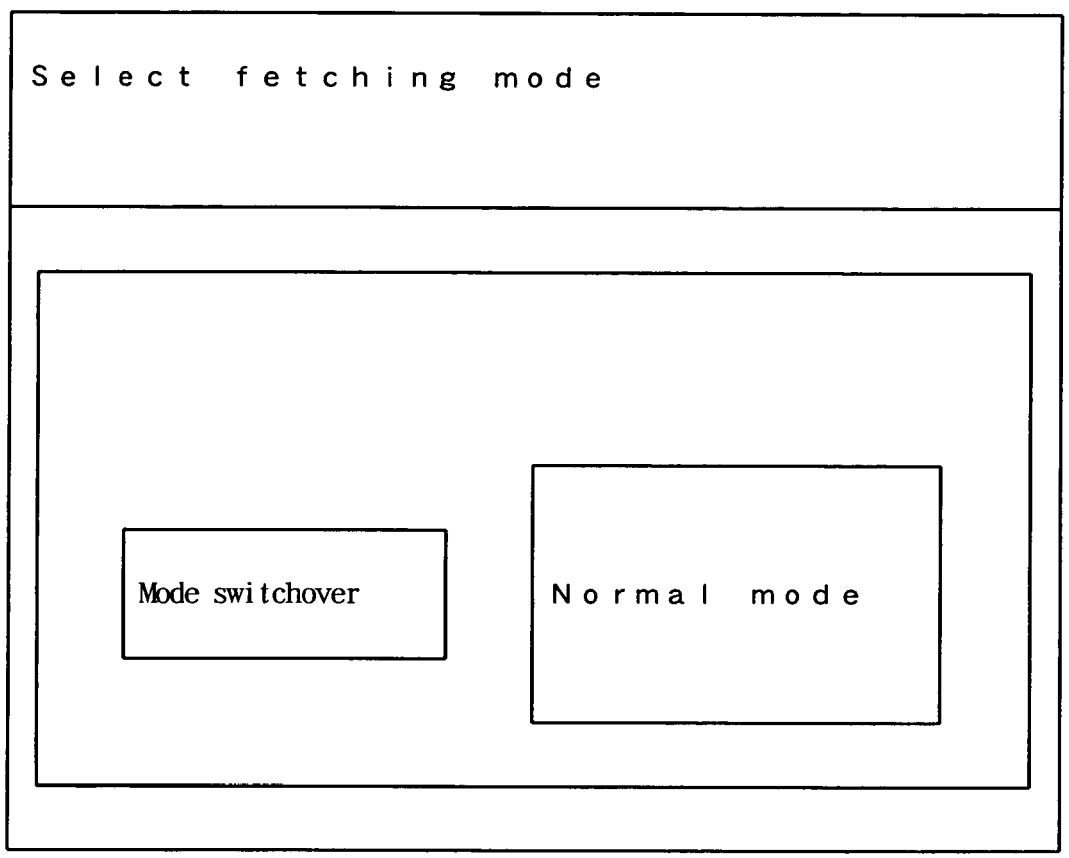
FIG. 16 shows the image on the touch panel for selection of fetching mode.

First, a mode switchover button and a mode display column are displayed on the touch panel (FIG. 16). The user chooses by mode switchover button either "Normal mode" to fetch document image data using a cover with a mark or "Quick mode" to take out the just fetched document image data without using a cover with a mark (FIG. 19, Step S71).

To fetch document image data in the normal mode, a cover with a mark is set on the image reading means 13 and the mode switchover button is pressed to display "Normal mode" on the mode display column. Then the start button is pressed. And the fetching starts in the same way as in the first embodiment (FIG. 19, Steps S72–S73– . . . ).

To fetch data in the quick mode, the mode switchover button is pressed without a cover with a mark to display "Quick mode" on the mode display column. Then, the start button is pressed.

Figure 19:
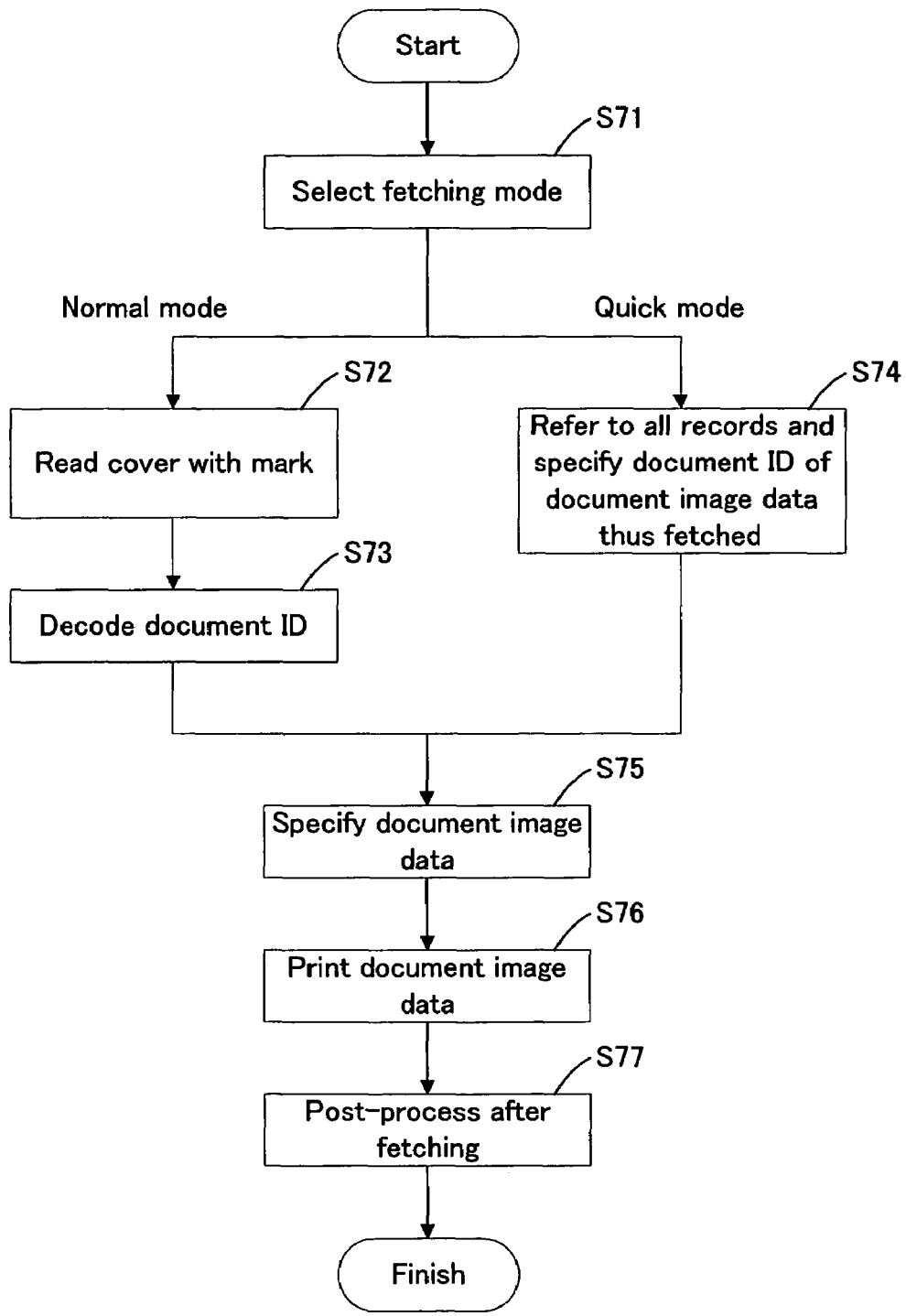
FIG. 19 is a flow chart of the process of fetching in the second embodiment.

The document management means 300 refers to all the records in the fields for the date and time of fetching on the attribute management table T10*a* and finds out the document ID of the document image data just fetched (FIG. 19, Step S74).

Referring to the attribute management table T10a as shown in FIG. 17 (a), the document management means 300 judges the document image data fetched on Sep. 17, 1998, at 17:23:18 as one just fetched and specifies the document ID of the document image data, that is, "0000004."

Then, the document image data of the document ID thus specified is specified by the document management means 300 and printed out by the output means 9. After the data is taken out, the following post-processing is done by the document management means 300 (FIG. 19, Steps S75–S76–S77).

The document management means 300 searches the attribute management table T10a with the document ID of the fetched document image data as retrieval key. After specifying the corresponding code, the means 300 enters the date of fetching in the field for the date of fetching and the time of fetching in the field for the time of fetching.

As set forth above, it is arranged in the digital multifunction apparatus of the present embodiment that the date and time of fetching are written on the attribute management table T10a. Therefore, document image data just fetched can be taken out in a simple procedure without using a cover with a mark.

The date and time of registration are also entered on the attribute management table T10a as described in the post-processing after registration (FIG. 18, Step S64). Therefore, document image data just registered can be fetched in a simple procedure. The reason why the date and time of registration are entered is this. It can happen that document image data is not fetched yet soon after registration and can not be specified as one just fetched. That is, an attempt to fetch document image data in the quick mode with no records in the fields for the date and time of fetching would fail, because that data has not been fetched yet. Therefore, it is so arranged that document image data just registered is specified the following way.

The document management means 300 confirms that nothing is entered in the fields for the date and time of fetching. Then, the means 300 refers to the fields for the date and time of registration and specifies the document ID for document image data just registered. The document management means 300 refers to the attribute management table T10b as shown in FIG. 17 (b), for example, and judges that the document image data registered on Feb. 3, 1998, at 11:30:30 is the document image data just registered and specifies the document ID of the document image data, that is, "0000005." Then, the document image data of the document ID thus specified is printed out by the output means 9, and information of the date and time of fetching is entered in the fields for the date and time of fetching in the same way as described above.

The procedure to specify document image data just registered is not limited to only data with no entries made in the fields for the date and time of fetching—the fields included in the records of the table T10b. This procedure to specify data on the basis of registration records may also be applied to data with the date and time of fetching entered in the fields for the date and time of fetching—data just fetched. That is, it may be so arranged that if an instruction is given to fetch data in the quick mode, not data just fetched but data just registered is specified.

The attribute management tables T10a, T10b that have been described contain fields for the date and time of fetching and registration. The present invention is not limited thereto. If, for example, the quick mode for fetching is limited to either data just registered or data just fetched, either the fields for the date and time fetching or the fields for the date and time of registration is not necessarily required.

It is arranged that document image data just registered or fetched is specified on the basis of the records in the attribute management table T10a or T10b. The present invention is not limited thereto. For example, it may be so arranged that each time data is fetched, the document ID for the fetched data is registered as document ID for data last fetched with some other area of the hard disk 97 than the area of attribute management table T10a. In this arrangement, the document image data represented by the document ID of the data last fetched can be specified by giving an instruction to fetch data in the quick mode. It goes without saying that the same can be achieved if the document image data corresponding to the document ID of the last fetched is registered in a specific region on the hard disk 97.

Embodiment 3

Fetching in the quick mode as described can be effected along with user authorization to advantage. The digital multifunction apparatus of the present embodiment is provided with user authorization means 12 and so configured that the document management means 300 specifies document image data on the basis of the individual user ID. This configuration will now be explained with the description limited to the points different from those in Embodiment 2.

First, the user authorization means 12 comprises magnetic card reader 12b to read the user ID written in a magnetic card and user management means 12a that manages users, and has the following functions:

(1) Issues a user ID when an instruction for user registration is given through the control panel 102, and registers on a user management table T12 of the memory means 97 the user ID with the user's name, password etc. related to it.

(2) Checks if the user ID inputted from the magnetic card reader 12b is registered or not with the user management table T12.

FIG. 21 shows an internal arrangement example of an attribute management table T10c that is registered with the memory means 97 along with the user management table T12. This attribute management table T10c is formed by adding a user ID field for writing the registered user ID's of users to the attribute management table T10a (FIG. 17 (a)). It may also be so arranged that the field for the number of pages in the attribute management table T10a is replaced with the user ID field.

The description of the operation of the present embodiment follows.

Registration:

A magnetic card is inserted to the magnetic card reader 12b to input the user ID. The user management means 12a checks if the user ID is registered with the user management table T12 (FIG. 22, Steps S 81–S82).

Figure 20:
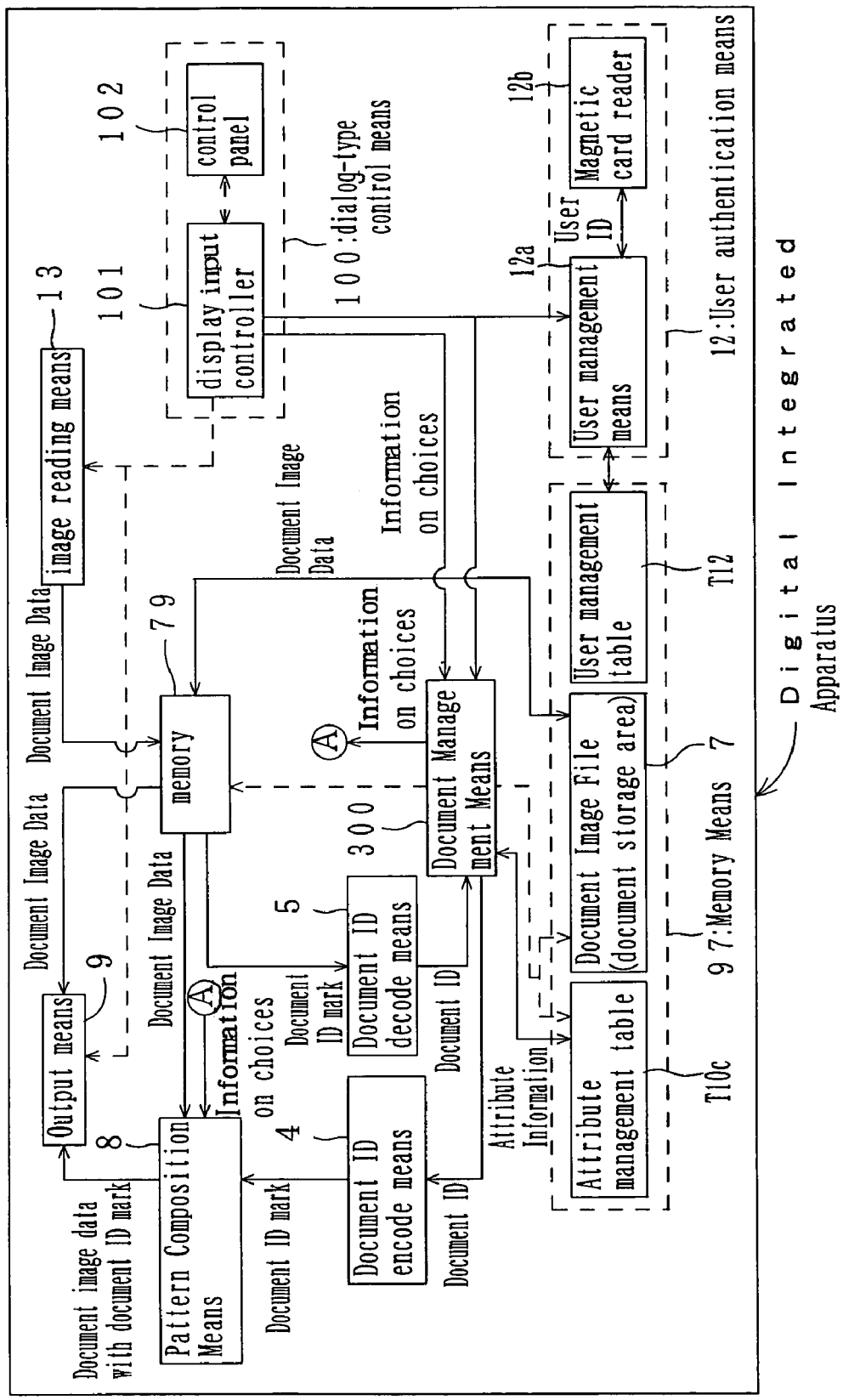
FIG. 20 is a schematic functional block diagram of the digital multifunction apparatus of a third embodiment of the present invention.
Figure 22:
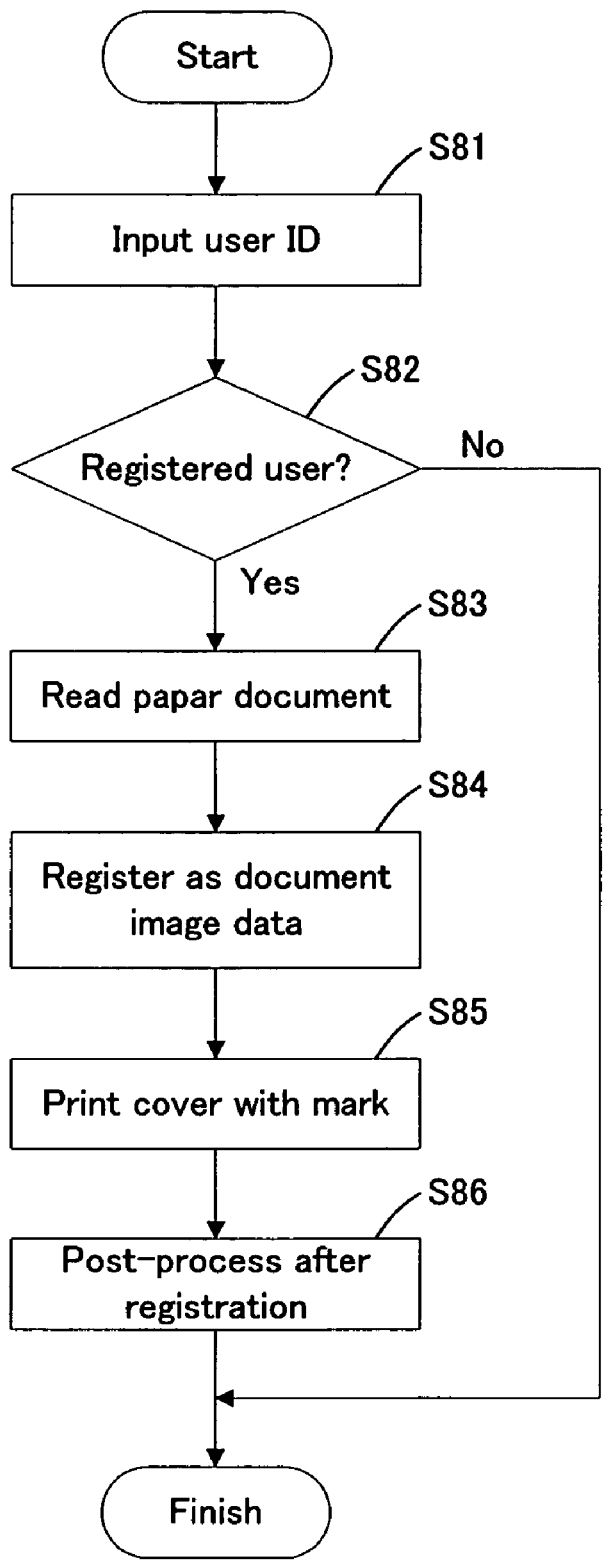
FIG. 22 is a flow chart of the process of registration in the third embodiment.

If the user ID is found to be registered with the user management table T12, then the user management means 12a instructs the display input controller 101 to display that message on the touch panel and at the same time informs the document management means 300 of the user ID (FIG. 22, Step S82: Yes). While it may be so configured that the user ID is conveyed to the document management means 300 through the display input controller 101, FIG. 20 shows an arrangement in which the user management means 12a directly informs the document management means 300.

In case the user ID is not registered with the user management table T12, the user management means 12a directs the display input controller 101 to display that message on the touch panel to end the registration process (FIG. 22, Step S82: No).

The subsequent steps are the same as those in the second embodiment except for the post-processing after registration (FIG. 22, Step S86). That is, the document management means 300 in the present embodiment enters not only the fields for document ID, the number of pages, image size, date and time of registration but also writes the user ID given by the user management means 12a in the user ID field.

Figure 23:
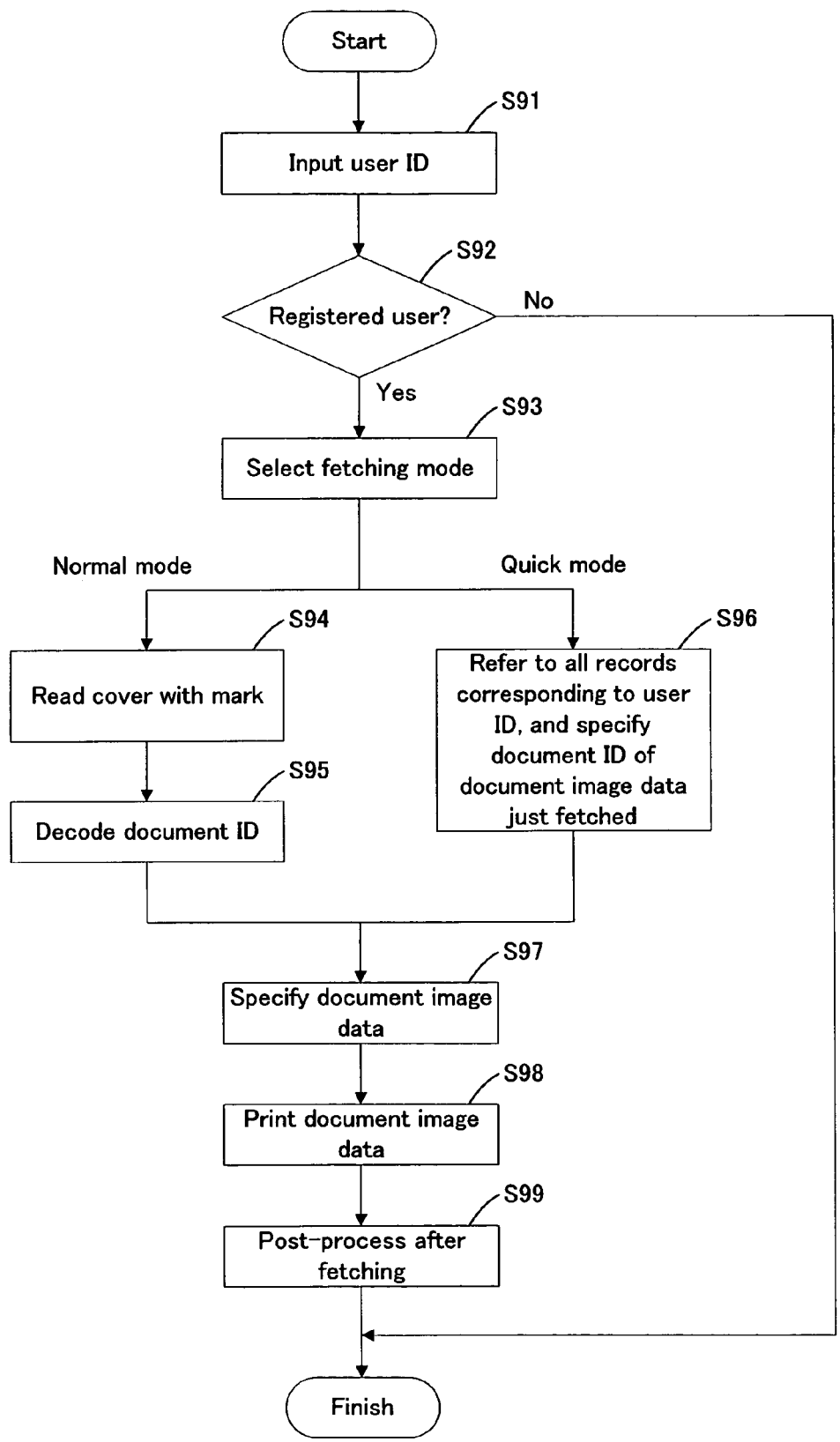
FIG. 23 is a flow chart of the process of fetching in the third embodiment.

Fetching:

Fetching will be described with reference to FIG. 23.

The user is first authorized in the same way as in steps S81 and S82 in FIG. 22. Then, the fetching mode is selected (FIG. 23, Steps S91–S92–S93).

In case fetching is effected in the normal mode, the document ID will be indicated, and no user ID is needed when document image data is specified. In the following, therefore, there will be described the process when the quick mode is selected.

If an instruction is given for fetching in the quick mode, the user management means 12a informs the document management means 300 of the user ID. So informed, the document management means 300 refers to the fields for the date and time of fetching in the records represented by the user ID, and specifies the document ID for the document image data just fetched (FIG. 23, Step S96). Needless to say, the document ID thus specified is the document ID for the document image data the user has just fetched. The subsequent steps are identical with those in the second embodiment and will not be described.

As set forth above, fetching in the quick mode is effected along with user authorization to advantage in the present embodiment. That is, even if a number of users use the same digital multifunction apparatus, each user can fetch document image data—document image data each user has just fetched—in simple steps without using a cover with a mark.

The above description indicates that since it is checked only whether the user ID is registered, any registered user can fetch document image data in the normal mode that has been registered by another user. To preclude that possibility, it may be so arranged that the registering user provides a protection for the document image data. To be specific, that possibility can be excluded with document image data kept confidential by this arrangement. That is, the access rights of other users to registered document image data are regulated (as, for example, to deny access to any other user, allow access to a specific other user or allow access to any user). When document image data is fetched, the access right status is checked.

The process has been described of fetching document image data—the document image data the user has just taken out—without using a cover with a mark. Needless to say, the user can fetch document image data—the document image data that the user has just registered—without using a cover with a mark.

Further noted is that the digital multifunction apparatus has been taken up to illustrate the present invention. The present invention is also applicable to image inputting and outputting apparatuses that permit the inputting and outputting of document image data such as personal computer with a scanner and a printer connected thereto.

It is to be understood that while specific embodiments of the invention have been shown and described in detail to illustrate the application of the inventive principles, the invention is not limited thereto but may be otherwise variously embodied within the scope of the following claims.

What is claimed is:

1. An image inputting and outputting apparatus comprising:
    document management means for registering document image data in memory means by adding a document ID to identify said document image data on the basis of user's instructions,
    pattern composition means for generating document image data with document ID mark by integrating a document ID mark corresponding to said document ID and a specific page of said document image data,
    output means for outputting the document image data with document ID mark from said pattern composition means, and
    dialog-type control means for inquiring of a user if the reading of a document for generating said document image data is completed or not, and giving a completion notice of reading the document to said document management means,
    wherein said document management means is configured for, upon receipt of the completion notice, registering said document image data in the memory means by correlating the document image data with the document ID.

2. The image inputting and outputting apparatus as defined in claim 1 wherein said dialog-type control means is configured for inquiring of the user if the reading of the document by document image inputting means is completed after the last page of the document is read by the document image inputting means.

3. The image inputting and outputting apparatus as defined in claim 1 wherein said dialog-type control means is configured for inquiring of the user if the reading of the document by document image inputting means is completed before the last page of the document is read by the document image inputting means.

4. An image inputting and outputting apparatus for registering document image data in memory means and managing said document image data being correlated with a document ID so that the document image data can be fetched when the document ID corresponding to said document image data is given, said apparatus comprising:
    document management means configured for performing a first function to specify document image data on the basis of a latest registration record or a latest fetching record for the document image data in the memory means and configured for performing a second function to specify document image data on the basis of an inputted document ID corresponding to the document image data; and
    dialog-type control means for directing a selective switchover between said two functions.

5. The image inputting and outputting apparatus as defined in claim 4 wherein said memory means is at least one out of hard disk, removable media and network-connected server.

6. The image inputting and outputting apparatus as defined in claim 4 wherein in case no document image data has just been fetched, document image data to be fetched is specified on the basis of the latest registration record in the memory means.

7. The image inputting and outputting apparatus as defined in claim 4 wherein said document management means is provided with an attribute management table where a document ID corresponding to document image data in the memory means is written, and wherein date and time of latest registration or latest fetching of document image data are added to said attribute management table as the latest registration record or the latest fetching record so that document image data to be fetched can be specified based on said date and time of the latest registration or the latest fetching of the document image data.

8. An image inputting and outputting apparatus for registering document image data in memory means and managing said document image data being correlated with a document ID so that the document image data can be fetched when the document ID corresponding to said document image data is given, said apparatus comprising:

document management means for specifying document image data on the basis of a latest registration record or a latest fetching record for the document image data in the memory means, instead of inputting the corresponding document ID, wherein said document management means is provided with an attribute management table where a document ID corresponding to document image data in the memory means is written, and date and time of latest registration or latest fetching of document image data are added to said attribute management table as the latest registration record or the latest fetching record so that document image data to be fetched could be specified based on said date and time of the latest registration or the latest fetching of the document image data, said image inputting and outputting apparatus further comprising dialog-type control means for inputting an instruction to fetch document image data based on the date and time of the latest registration or the latest fetching of the document image data.

9. The image inputting and outputting apparatus as defined in claim 4, further comprising user authentication means for inputting a user ID allocated to each user to authenticate said user, wherein said document management means is configured for specifying document image data based on the latest registration record or the latest fetching record of the document image data for said user ID.

10. The image inputting and outputting apparatus as defined in claim 4, wherein said document management means is provided with an attribute management table where a document ID corresponding to document image data in the memory means is written, date and time of latest registration or latest fetching of document image data are added to said attribute management table as the latest registration record or the latest fetching record so that document image data to be fetched could be specified based on said date and time of the latest registration or the latest fetching of the document image data, and said dialog-type control means for inputting an instruction to fetch document image data based on the date and time of the latest registration or the latest fetching of the document image data.

* * * * *